(12) United States Patent
Duell et al.

(10) Patent No.: US 9,829,967 B2
(45) Date of Patent: Nov. 28, 2017

(54) TECHNIQUES FOR LIMITING POWER VIA SECONDARY CONTROL OF A VOLTAGE REGULATOR

(71) Applicant: NVIDIA CORPORATION, Santa Clara, CA (US)

(72) Inventors: Sam Duell, San Jose, CA (US); Jonah Alben, San Jose, CA (US); Andrew R. Bell, San Francisco, CA (US); Ming Chen, Palo Alto, CA (US); Gabriele Gorla, Santa Clara, CA (US); Qi Lin, San Jose, CA (US); Henry Pang, San Jose, CA (US); Gokul Santhirakumaran, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 105 days.

(21) Appl. No.: 14/879,040

(22) Filed: Oct. 8, 2015

(65) Prior Publication Data
US 2017/0102760 A1    Apr. 13, 2017

(51) Int. Cl.
G06F 1/32    (2006.01)
G06F 1/26    (2006.01)

(52) U.S. Cl.
CPC .............. *G06F 1/3296* (2013.01); *G06F 1/26* (2013.01); *G06F 1/324* (2013.01); *G06F 1/3206* (2013.01)

(58) Field of Classification Search
CPC ....................................................... G06F 1/26
See application file for complete search history.

(56) References Cited

U.S. PATENT DOCUMENTS

2006/0174143 A1\* 8/2006 Sawyers ................... G06F 1/26
                                                        713/300
2013/0063108 A1\* 3/2013 Nishida ................. H02M 3/156
                                                        323/271

\* cited by examiner

*Primary Examiner* — Albert Wang
(74) *Attorney, Agent, or Firm* — Artegis Law Group, LLP

(57) ABSTRACT

A power subsystem is configured to manage the maximum power usage of a computer subsystem. A power detector determines when power usage approaches the maximum capability of the power supply. The power detector generates a signal that corresponds to power usage. A controller then applies the signal to the system voltage regulator as a secondary regulation function such that the output voltage is reduced in a manner that supports maximum operating voltage while limiting power usage to within the capability of the power supply. The controller may configure the signal to implement the secondary regulation function as a modification of the feedback voltage, the reference voltage, or the current feedback of the regulator. As a result the subsystem causes the computer subsystem to operate at an optimum point on the voltage-current curve of the power supply.

20 Claims, 13 Drawing Sheets

TECHNIQUES FOR LIMITING POWER VIA SECONDARY CONTROL OF A VOLTAGE REGULATOR

BACKGROUND OF THE INVENTION

Field of the Invention

Embodiments of the present invention relate generally to graphics processing and, more specifically, to techniques for limiting power via secondary control of a voltage regulator.

Description of the Related Art

Computer systems performing data processing, in particular graphics processing, include millions of integrated transistors and transistor pairs that actively switch between a supply voltage level and a ground, or zero voltage, reference level during operation. As the number of cells that actively switch during operation increases, the overall power consumption of the system increases. Furthermore, the frequency at which the cells actively switch contributes to power consumption, because power usage increases as cells switch faster.

A computer subsystem receives power from a power supply. A power supply typically includes a regulator that provides a fixed voltage. The regulator must be specified to provide a maximum power, that is, the fixed voltage at some maximum current. Frequently, the processing demands of a computer subsystem create a wide range of dynamic load on the regulator. The system performance metrics may be related to the average of the dynamic loading, but the power supply must be designed to handle the peak of the load.

The above condition may be avoided by careful design to limit/match the total processing power to the capability of the power supply. Such an approach may lead to an overdesigned power supply, with the associated size and weight penalties. Alternatively, the processing frequency may be reduced to limit/match the peak power usage to the capability of the power supply. Such an approach imposes a constraint on the performance of the subsystem by limiting processing speed.

As an alternative to trying to limit/match total processing power to the capability of the power supply, some computer systems measure power consumption via voltage and current measurements and reduce processing speed to cap the power consumption below a maximum power limit. Such an approach can act to compress the dynamic range of the loading power to increase the average loading while limiting the peak power below a specified limit.

One drawback to implementing a clock based power limit is that a digital processor must understand its power consumption through an analog to digital conversion of a sensor, or by a computation of power based on its activity. This analog to digital conversion or activity computation can cause delays that may preclude the system from responding to a given load increase before the power supply exceeds its specified limit. These conversion delays are compounded further by communication delays over I2C or other interface between the processor and the sensor. In short, the clock based response may not be fast enough to preclude the system load from exceeding the capability of the power supply. Further, a step decrease in frequency may not adequately coordinate the processing demands of the system with capability of the power supply. When a step reduction in frequency occurs, the power usage is reduced. The resulting power usage may be significantly less than the capability of the power supply, resulting in underutilization of system resources.

As the foregoing illustrates, what is needed in the art are more effective ways to limit power consumption when the processing demands of a system change.

SUMMARY OF THE INVENTION

One embodiment of the present invention sets forth a subsystem configured to regulate power to a processor, including a voltage regulator configured to output a first voltage, wherein the first voltage has a maximum power capability, a power detector configured to generate a first signal that represents the amount of power being used by the processor, and a controller configured to determine that an amount of power being used by the processor is approaching the maximum power capability, combine the first signal with a control signal to generate a second signal, wherein the control signal represents a modification to the first voltage, and transmit the second signal to the voltage regulator that causes the voltage regulator to reduce the first voltage to limit the amount of power being used by the processor.

One advantage of the disclosed approach is that fast and accurate control of the regulated power supply voltage affords efficient operation over the full range of the voltage-current relationship of the power supply. The system may operate at the optimum frequency supported by the power supply, thus improving performance, while achieving maximum power utilization.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
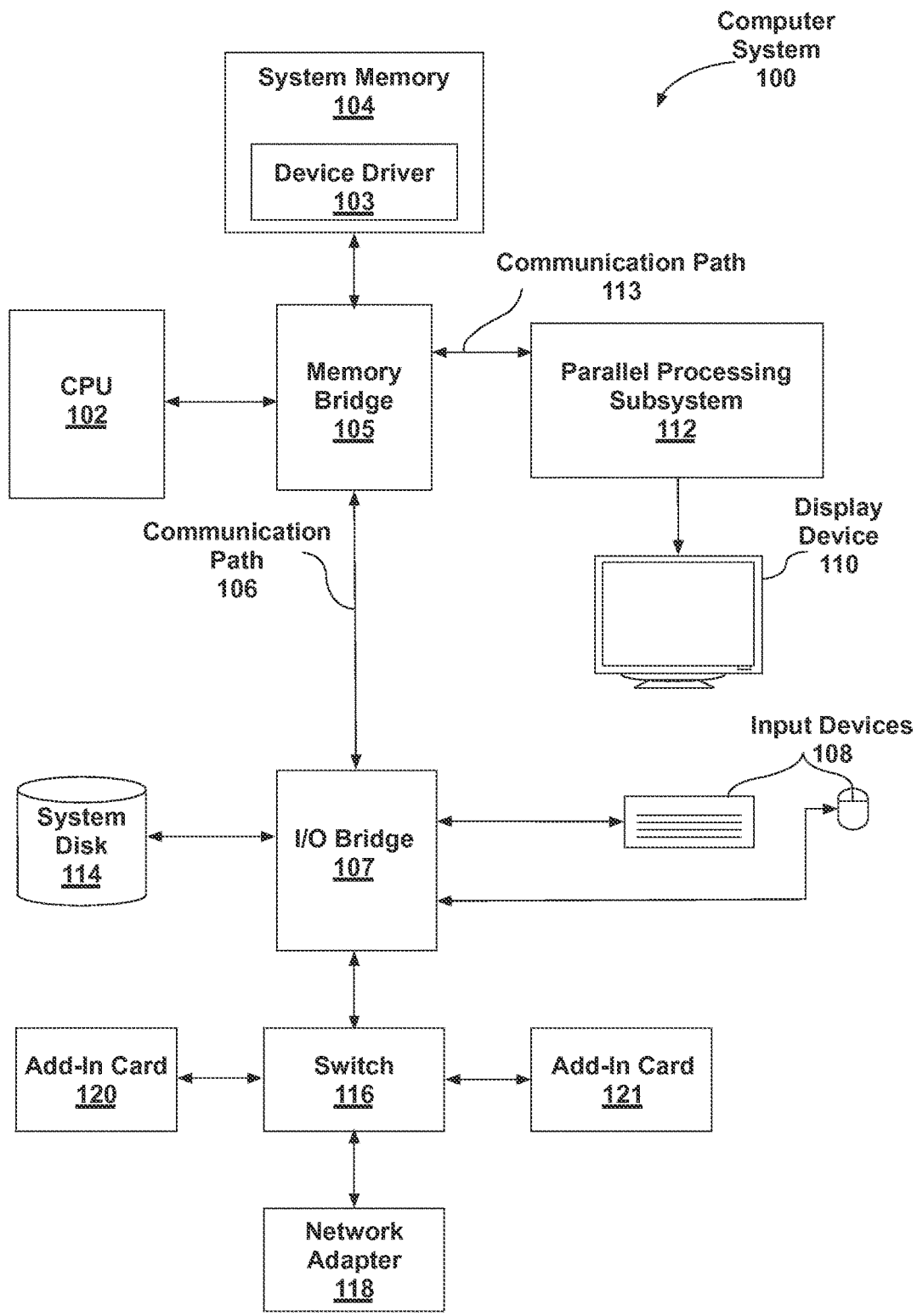
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
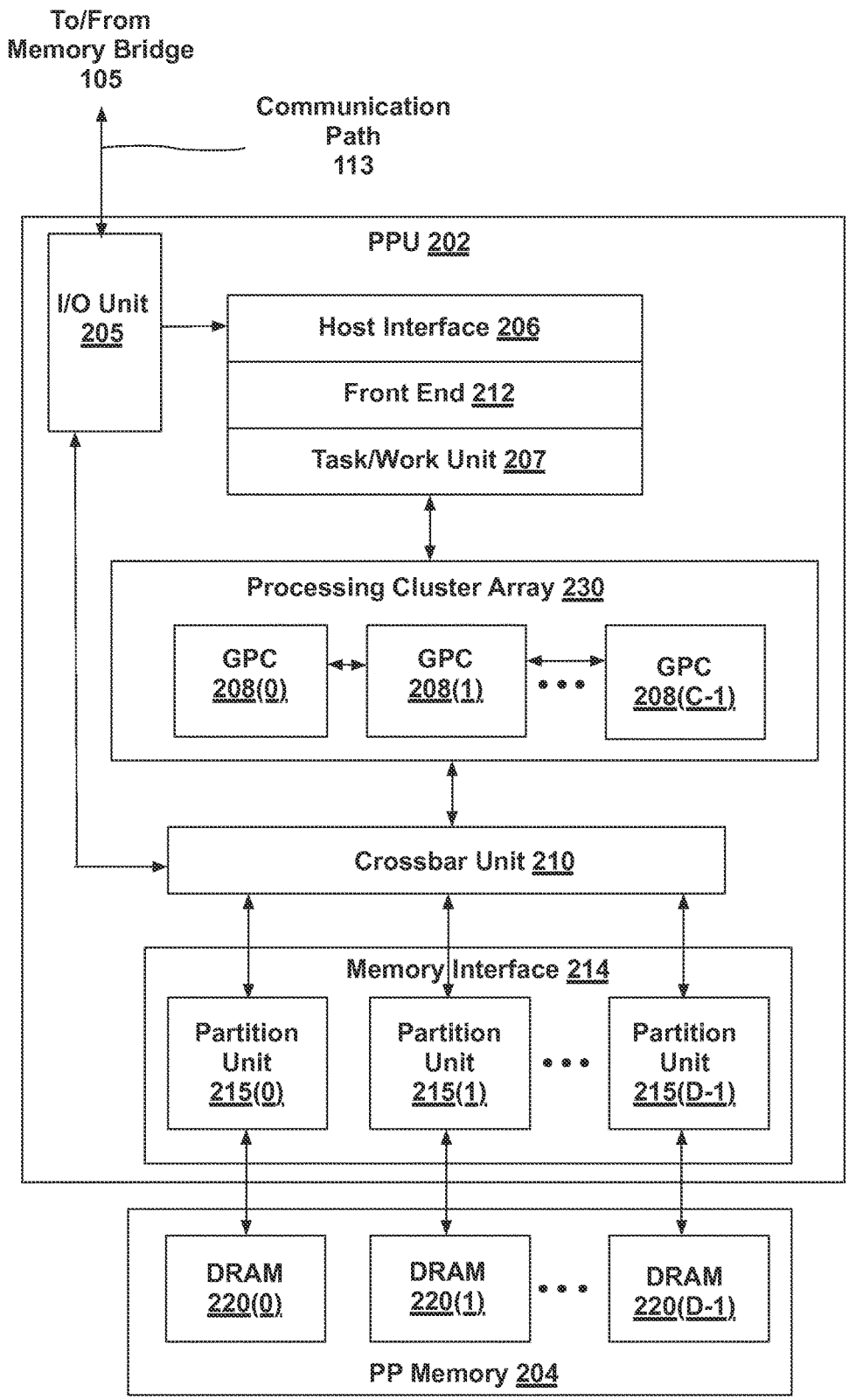
FIG. 2 is a block diagram of a parallel processing unit included in the parallel processing subsystem of FIG. 1, according to various embodiments of the present invention.

FIG. 2 is a block diagram of a parallel processing unit (PPU) 202 included in the parallel processing subsystem 112 of FIG. 1, according to various embodiments of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system on chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Limiting Power Via Secondary Control of a Voltage Regulator

Figure 3:
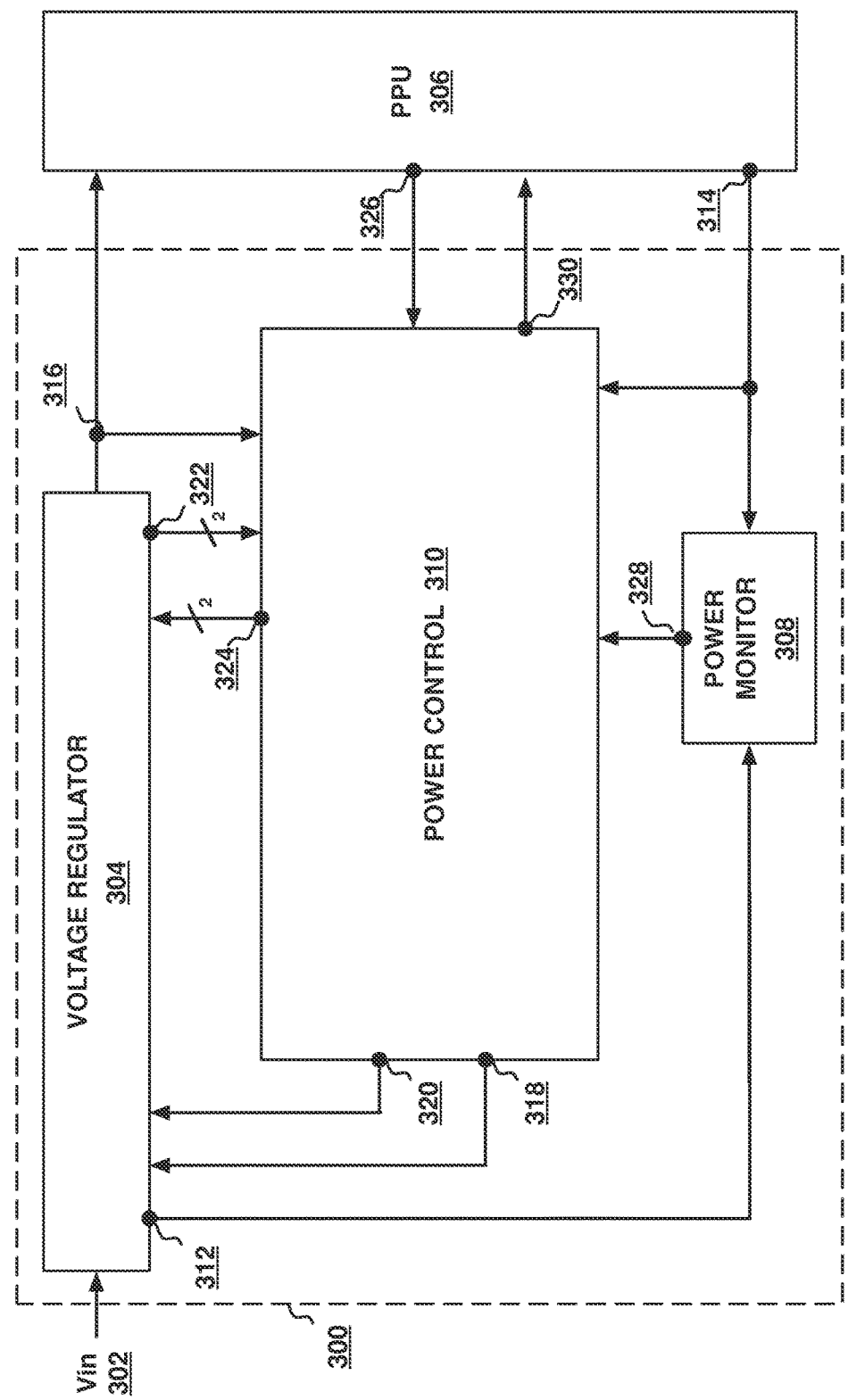
FIG. 3 is a block diagram of a power subsystem that supplies power to a PPU, according to various embodiments of the present invention.

FIG. 3 is a block diagram of a power subsystem 300 that supplies power to a PPU 306, according to various embodiments of the present invention. Power subsystem 300 may be included within any portion of computer system 100 of FIG. 1. For example, CPU 102 of FIG. 1 or PPU 202 of FIG. 2 may include one or more instances of power subsystem 300. Further, power subsystem 300 may be included within PPU 306. As shown, power subsystem 300 includes voltage regulator 304, power monitor 308, and power control 310.

Voltage regulator 304 receives an input power supply voltage, Vin 302, and generates regulator output voltage 316. Further, voltage regulator 304 receives regulator feedback 320 and regulator reference 318 from power control 310. Voltage regulator 304 regulates by driving regulator output voltage 316 such that regulator feedback 320 is equal to regulator reference 318.

Voltage regulator 304 provides a differential regulator current sense 322 to power control 310 and receives a differential regulator current feedback 324 from power control 310. Voltage regulator 304 reduces regulator output voltage 316 when regulator current feedback 324 exceeds an internal threshold implemented as part of the design of the regulator.

Voltage regulator 304 provides input current 312 to power monitor 308. PPU 306 provides load current sense 314 to power monitor 308. Power monitor 308 then provides power monitor output 328, a signal representing power usage, to power control 310. PPU 306 receives regulator output voltage 316 and provides PPU clock slowdown 330 to PPU 306.

Power control 310 controls the voltage and current feedback and reference voltage for voltage regulator 304. According to various embodiments of the present invention, the connectivity within power control 310 may vary as depicted below in conjunction with FIGS. 4 through 10.

Figure 4:
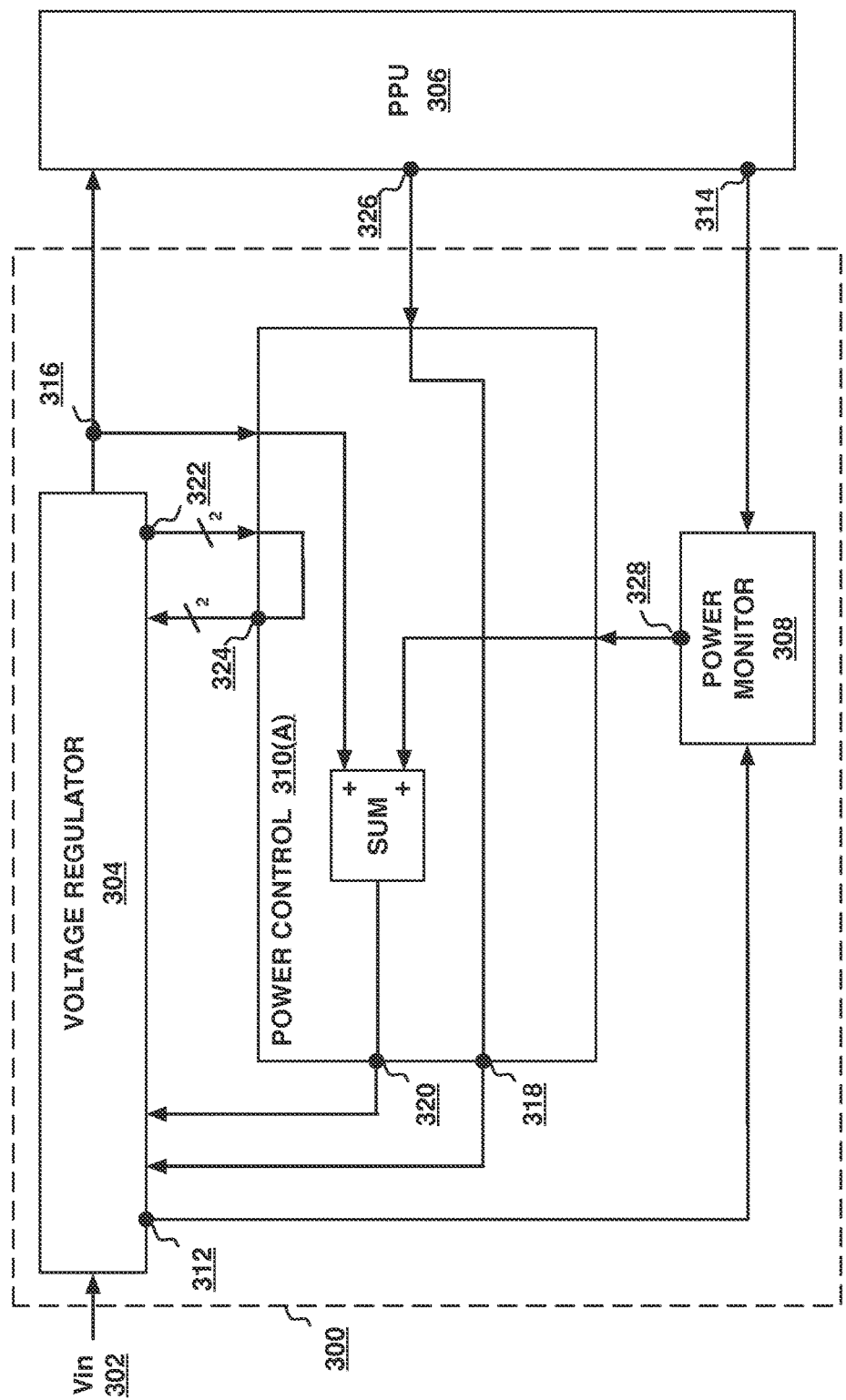
FIG. 4 is a conceptual illustration of connectivity within the power subsystem of FIG. 3 when configured to limit power via a feedback voltage modification, according to various embodiments of the present invention.

FIG. 4 is a conceptual illustration of connectivity within the power subsystem configured to limit power via feedback voltage modification, according to various embodiments of the present invention. As shown, power control 310(A) receives regulator output voltage 316. Power control 310(A) further receives power monitor output 328, computes the sum of regulator output voltage 316 and power monitor output 328 and outputs the sum as regulator feedback 320.

Power control 310(A) further connects PPU reference output 326 to regulator reference 318 and connects regulator current sense 322 to regulator current feedback 324. Power control 310(A) does not include connections for PPU load current sense 314 or PPU clock slowdown 330 shown in FIG. 3. The conceptual elements included in FIGS. 3 through 10 are shown without regard to physical location or method of implementation within the subsystem.

In this configuration, power control 310(A) increases regulator feedback 320 proportionally to the output power so that the regulator generates a lower output voltage to match PPU reference output 326. Regulator output voltage 316 is immediately reduced as the output power approaches the capability of the power supply. In operation, when the programmed power limit is exceeded, power monitor output 328 is scaled and summed to regulator output voltage 316, to generate an augmented feebdack signal at regulator feedback 320. The augmented feedback signal causes regulator output voltage 316 to drop by a fixed step.

Figure 5:
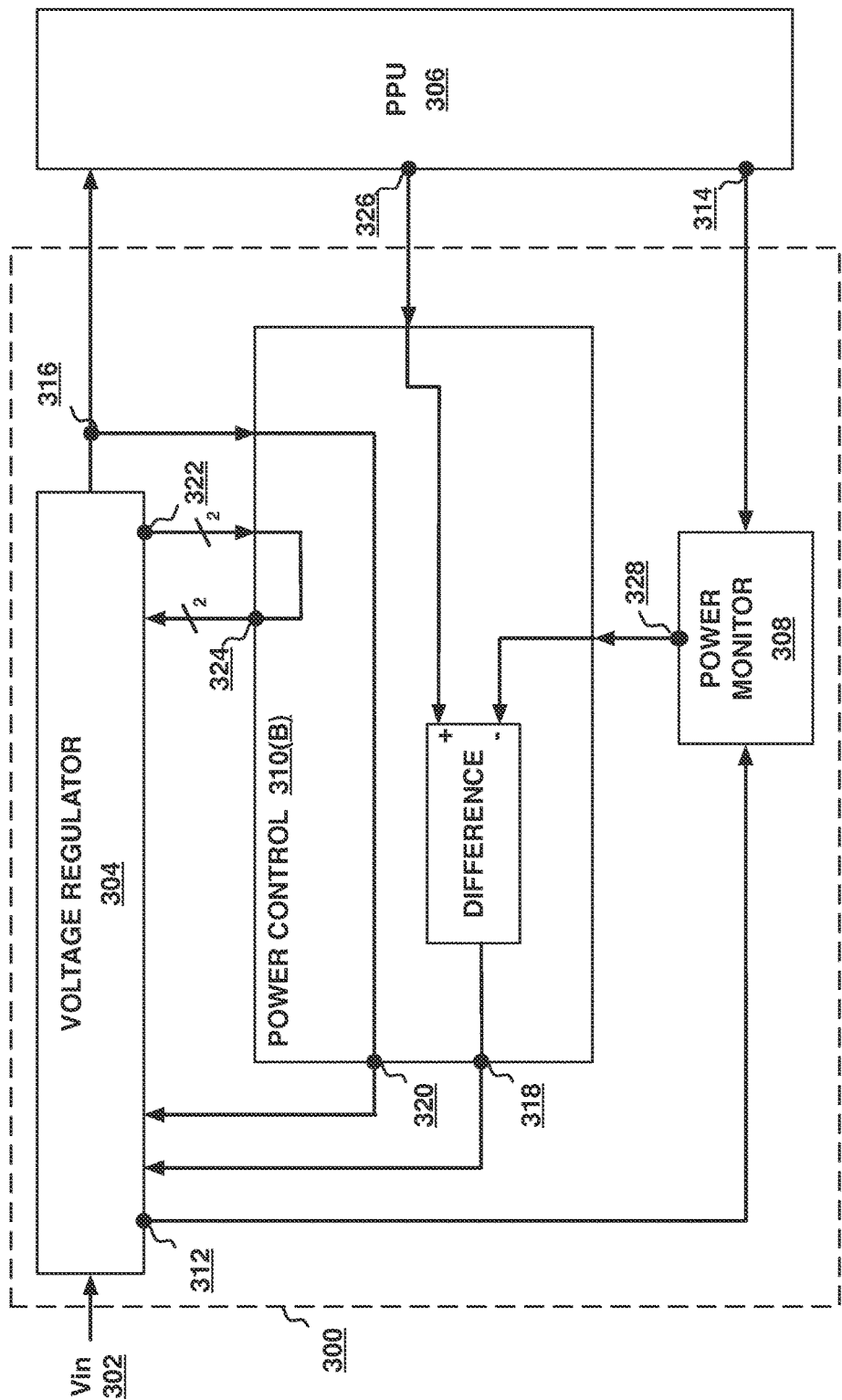
FIG. 5 is a conceptual illustration of connectivity within the power subsystem of FIG. 3 when configured to limit power via a reference voltage modification, according to various embodiments of the present invention.

FIG. 5 is a conceptual illustration of connectivity within the power subsystem of FIG. 3 when configured to limit power via reference voltage modification, according to various embodiments of the present invention. As shown, power control 310(B) receives PPU reference output 326. Power control 310(B) further receives power monitor output 328, subtracts power monitor output 328 from PPU reference output 326 and outputs the difference as regulator reference 318.

Power control 310(B) further connects regulator output voltage 316 to regulator feedback 320 and connects regulator current sense 322 to regulator current feedback 324. Power control 310(B) does not include connections for PPU load current sense 314 or PPU clock slowdown 330.

In this configuration, power control 310(B) reduces regulator reference 318 proportionally to the output power so that the regulator generates a lower output voltage to match the reduced regulator reference 318. This configuration is functionally equivalent to the configuration depicted in conjunction with FIG. 4, reducing the reference rather than increasing the feedback.

Figure 6:
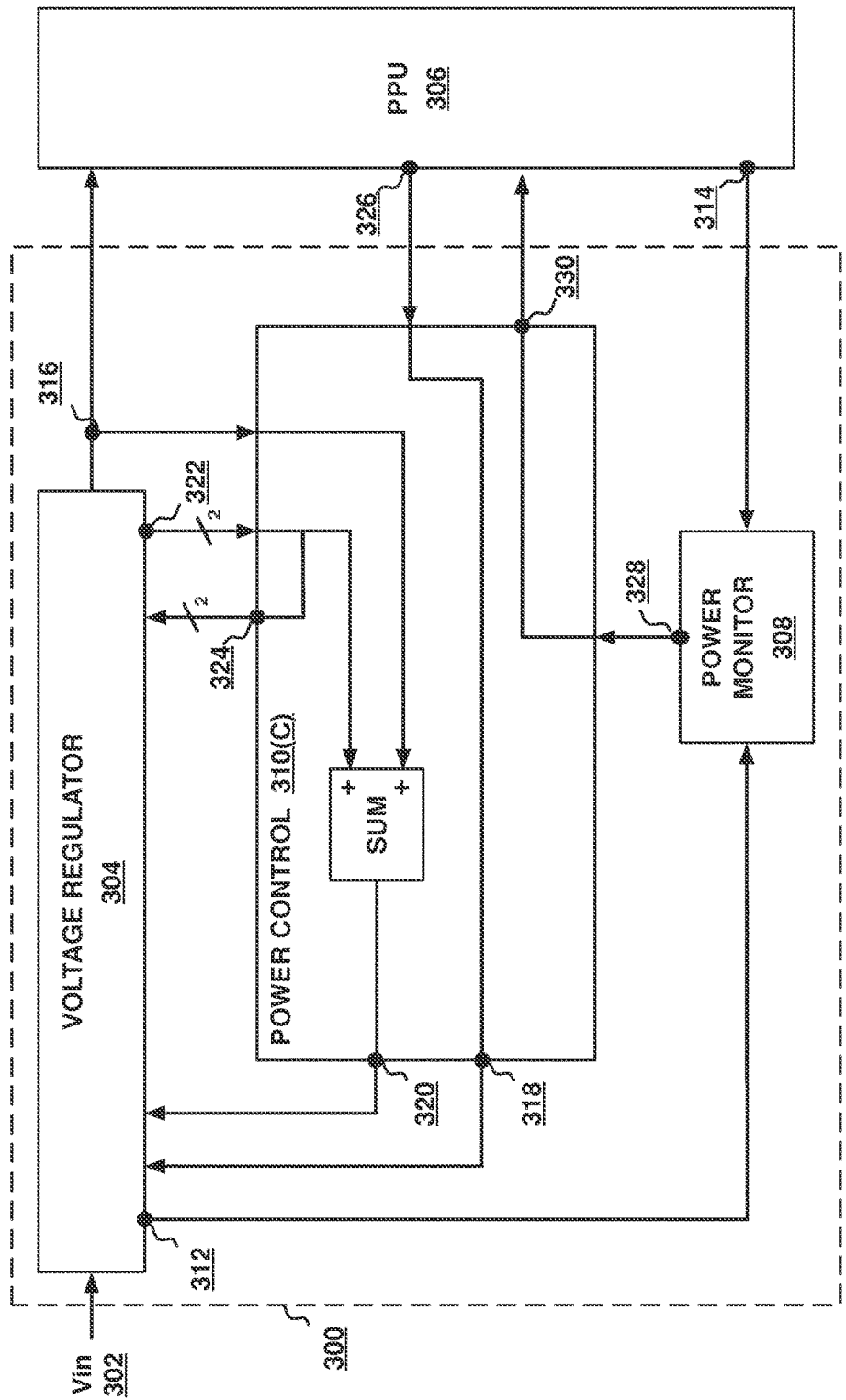
FIG. 6 is a conceptual illustration of connectivity within the power subsystem of FIG. 3 when configured to limit power via a current limited voltage feedback voltage modification, according to various embodiments of the present invention.

FIG. 6 is a conceptual illustration of connectivity within the power subsystem of FIG. 3 when configured to limit power via current limited voltage feedback voltage modification, according to various embodiments of the present invention. As shown, power control 310(C) receives regulator output voltage 316. Power control 310(C) further receives regulator current sense 322, computes the sum of regulator output voltage 316 and regulator current sense 322 and outputs the sum as regulator feedback 320.

Power control 310(C) further connects PPU reference output 326 to regulator reference 318 and connects regulator current sense 322 to regulator current feedback 324. Power control 310(C) further connects power monitor output 328 to PPU clock slowdown 330. PPU load current sense 314 is unused.

In this configuration, power control 310(C) causes a drop in the output voltage as a function of output current for any current above a fixed threshold set by hardware. An advantage of this approach is that this configuration can be built with an analog comparator circuit which is not affected by the sampling rate of an analog to digital converter or I2C polling.

Figure 7:
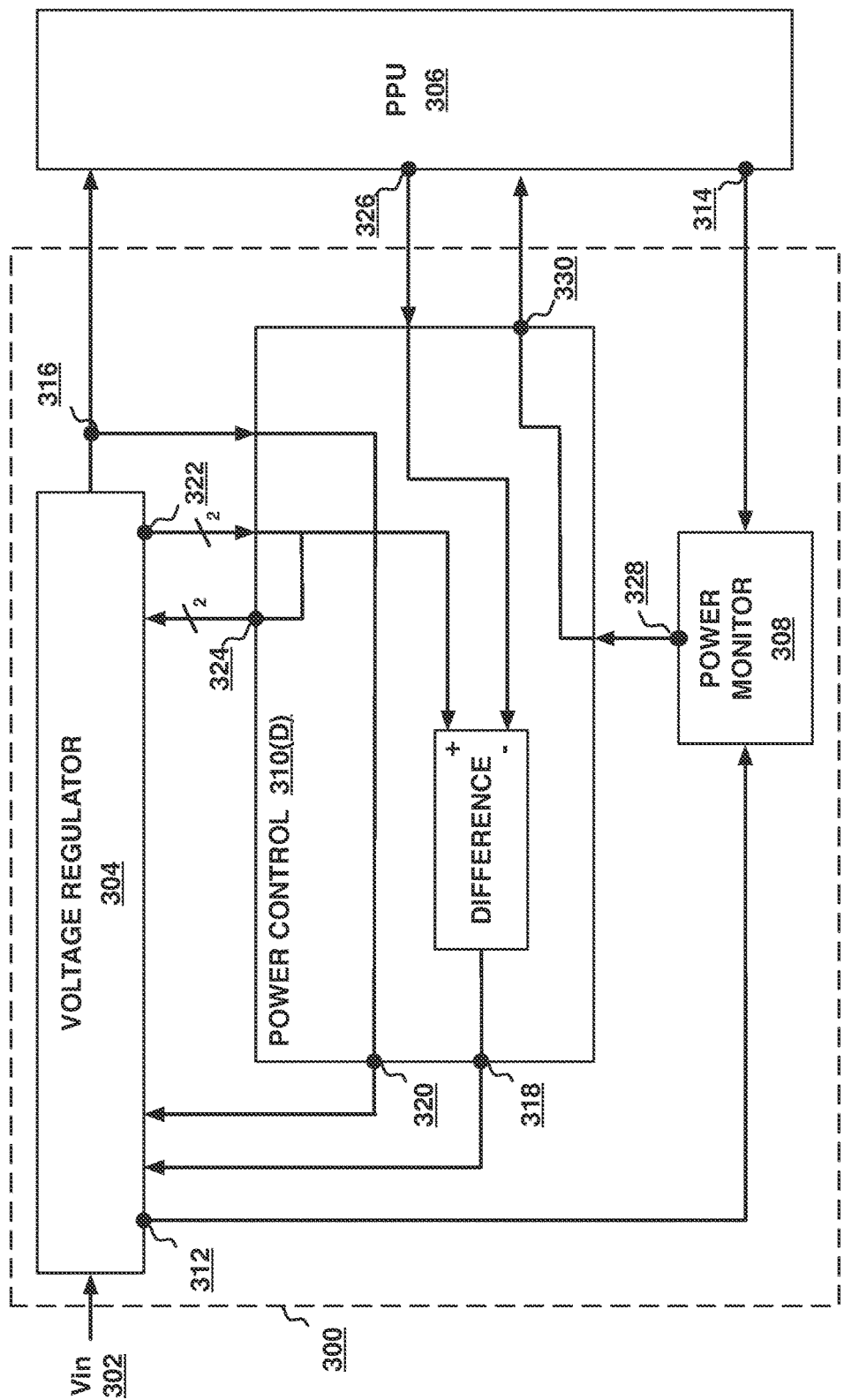
FIG. 7 is a conceptual illustration of connectivity within the power subsystem of FIG. 3 when configured to limit power via a current limited reference voltage modification, according to various embodiments of the present invention.

FIG. 7 is a conceptual illustration of connectivity within the power subsystem of FIG. 3 when configured to limit power via current limited reference voltage modification, according to various embodiments of the present invention. As shown, power control 310(D) receives PPU reference output 326. Power control 310(D) further receives regulator current sense 322, subtracts regulator current sense 322 from PPU reference output 326 and outputs the difference as regulator reference 318.

Power control 310(D) further connects regulator output voltage 316 to regulator feedback 320 and connects regulator current sense 322 to regulator current feedback 324. Power control 310(D) further connects power monitor output 328 to PPU clock slowdown 330. PPU load current sense 314 is unused.

In this configuration, power control 310(D) causes a drop in the output voltage as a function of output current for any current above a fixed threshold set by hardware. This configuration is functionally equivalent to the configuration depicted in conjunction with FIG. 6, reducing the reference rather than increasing the feedback.

Figure 8:
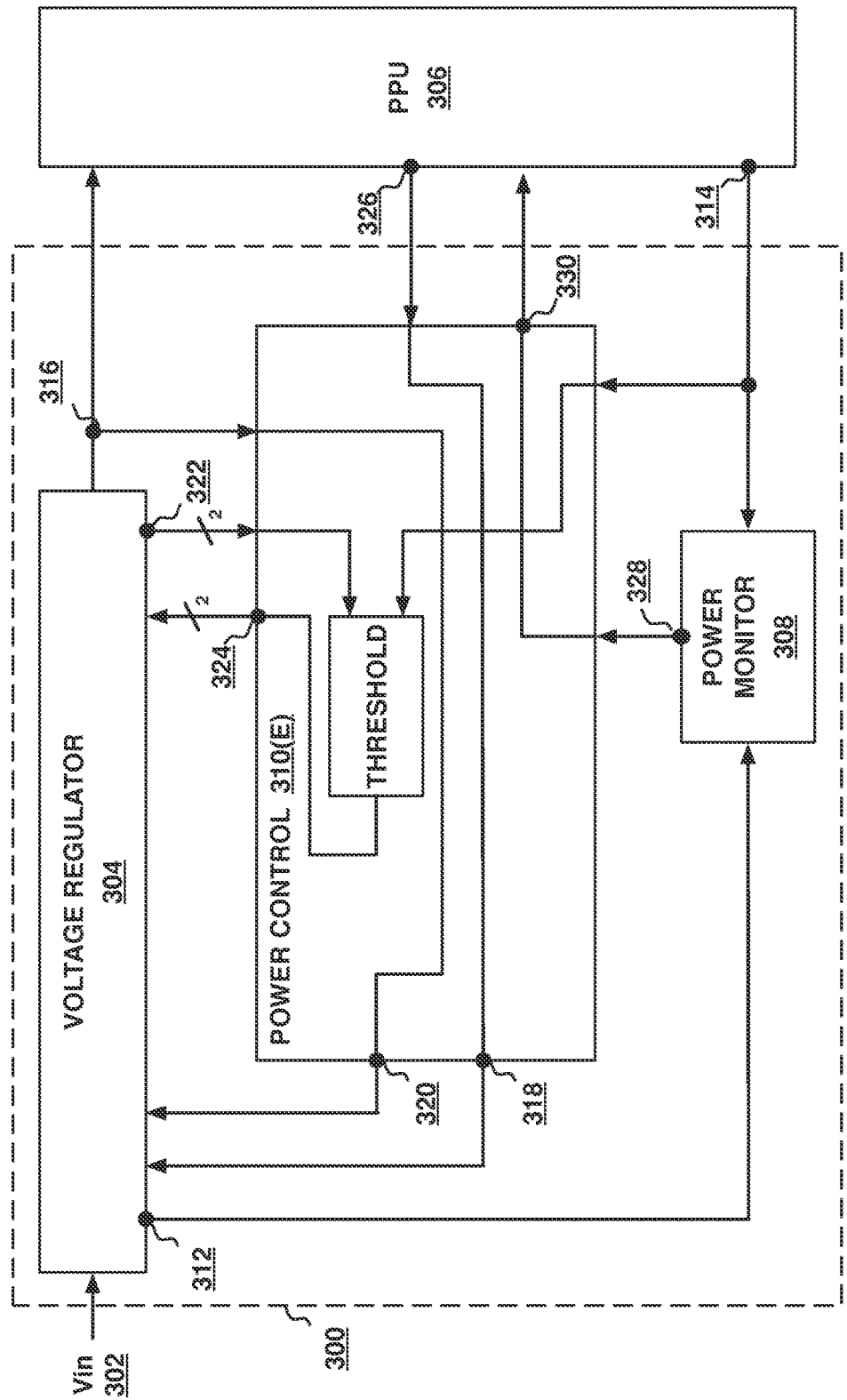
FIG. 8 is a conceptual illustration of connectivity within the power subsystem of FIG. 3 when configured to limit power via a current feedback modification, according to various embodiments of the present invention.

FIG. 8 is a conceptual illustration of connectivity within the power subsystem of FIG. 3 when configured to limit power via current feedback modification, according to various embodiments of the present invention. As shown, power control 310(E) receives PPU reference output 326 and regulator output voltage 136 and connects them to regulator reference 318 and regulator feedback 320 respectively.

Further, power control 310(E) receives PPU load current sense 314 and regulator current sense 322 and outputs regulator feedback current 324. Power control 310(E) establishes a threshold level at which regulator feedback current 324 is increased based on the load current level detected by the PPU. Further, power control 310(E) connects power monitor output 328 to PPU clock slowdown 330.

In this configuration, power monitor 308 samples the input power and adjusts the system clock frequency by reducing the VCO control voltage on a time scale that may be limited by analog to digital conversion or I2C transaction times. During analog to digital conversion or I2C transaction times, power control 310(E) may alter the threshold in real time to enforce a voltage frequency curve that limits maximum system power to the capability of the power supply.

Figure 9:
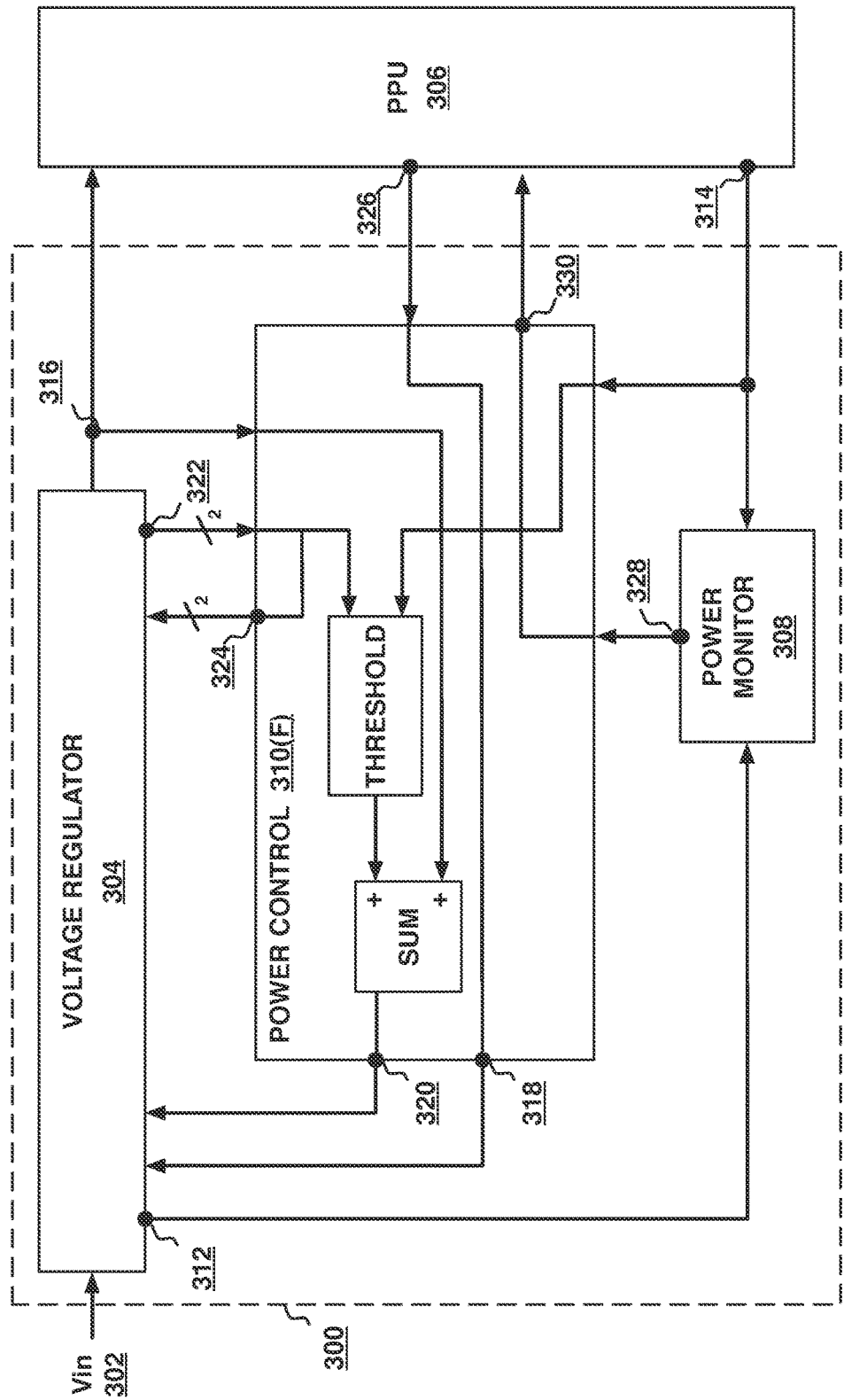
FIG. 9 is a conceptual illustration of connectivity within the power subsystem of FIG. 3 when configured to limit power via a current driven feedback voltage modification, according to various embodiments of the present invention.

FIG. 9 is a conceptual illustration of connectivity within the power subsystem of FIG. 3 when configured to limit power via current driven feedback voltage modification, according to various embodiments of the present invention. As shown, power control 310(F) receives PPU reference output 326 and connects PPU reference output 326 to regulator reference 318.

Further, power control 310(F) receives PPU load current sense 314 and regulator current sense 322 and connects regulator current sense 322 to regulator feedback current 324. Power control 310(F) then establishes a threshold level based on the load current level detected by the PPU and the current sensed by the regulator. Further, power control 310(F) receives regulator output voltage 316 and sums regulator output voltage 316 with the threshold level. Power control 310(F) then outputs the sum as regulator feedback 320.

In a similar manner to that which is depicted above in conjunction with FIG. 8, this configuration is designed to sample the input power and adjust the system clock frequency by reducing the VCO control voltage on a time scale that may be limited by analog to digital conversion or I2C transaction times. During analog to digital conversion or I2C transaction times, power control 310(F) may add a step increase to the regulator feedback 320 to enforce a voltage frequency curve that limits maximum system power to the capability of the power supply.

Figure 10:
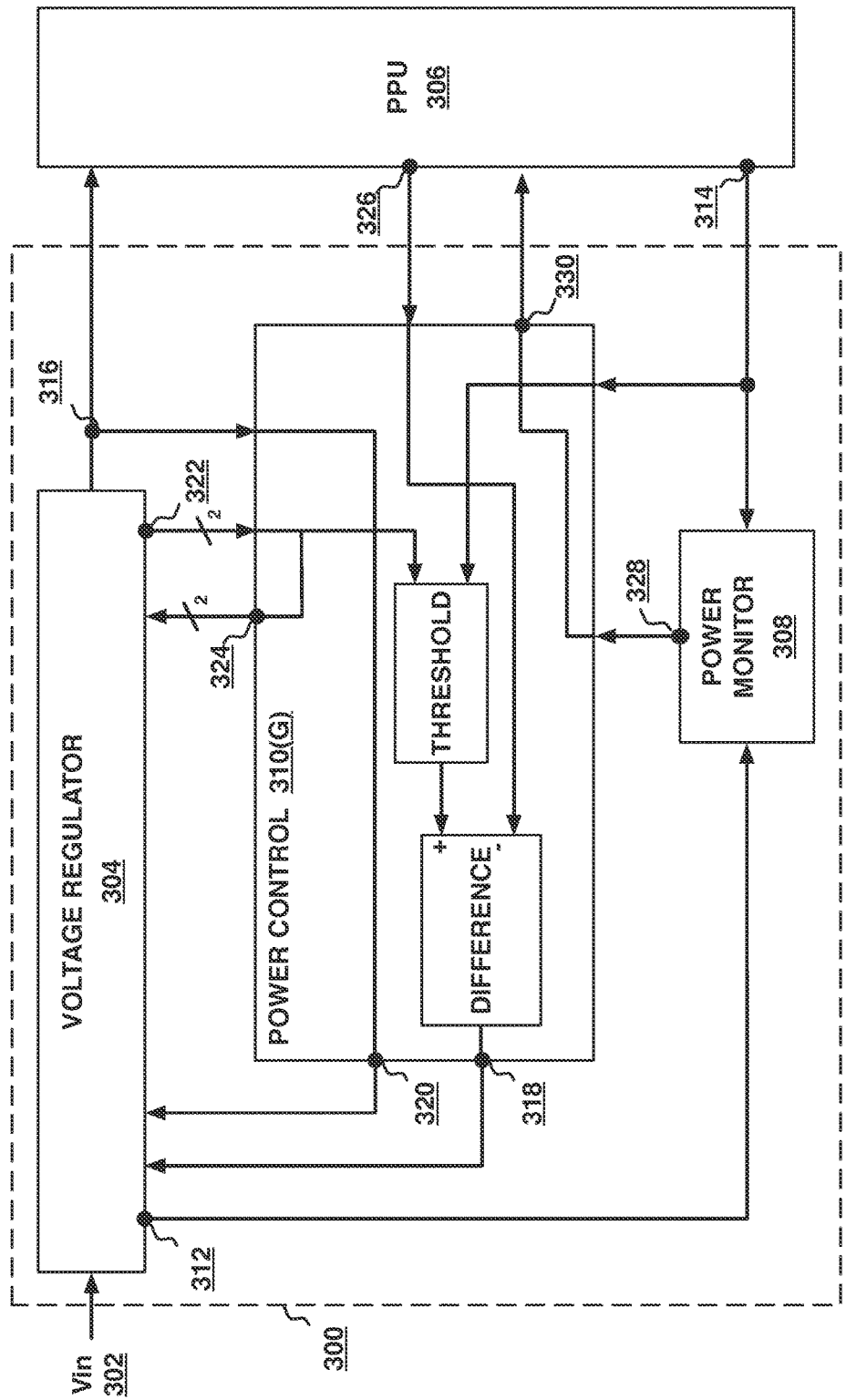
FIG. 10 is a conceptual illustration of connectivity within the power subsystem of FIG. 3 when configured to limit power via a current driven reference voltage modification, according to various embodiments of the present invention.

FIG. 10 is a conceptual illustration of connectivity within the power subsystem of FIG. 3 when configured to limit power via current driven reference voltage modification, according to various embodiments of the present invention. As shown, power control 310(G) receives regulator output voltage 316 and connects regulator output voltage 316 to regulator feedback 320.

Further, power control 310(G) receives PPU load current sense 314 and regulator current sense 322 and connects regulator current sense 322 to regulator feedback current 324. Power control 310(G) then establishes a threshold level based on the load current level detected by the PPU and the current sensed by the regulator. Further, power control 310(G) receives PPU reference output 326 and subtracts the threshold level from PPU reference output 326. Power control 310(G) then outputs the difference as regulator feedback 320.

In a similar manner to that which is depicted above in conjunction with FIG. 8 and FIG. 9, this configuration is designed to sample the input power and adjust the system clock frequency by reducing the VCO control voltage on a time scale that may be limited by analog to digital conversion or I2C transaction times. During analog to digital conversion or I2C transaction times, power control 310(G) may decrease the regulator reference 320 to enforce a voltage frequency curve that limits maximum system power to the capability of the power supply.

Figure 11:
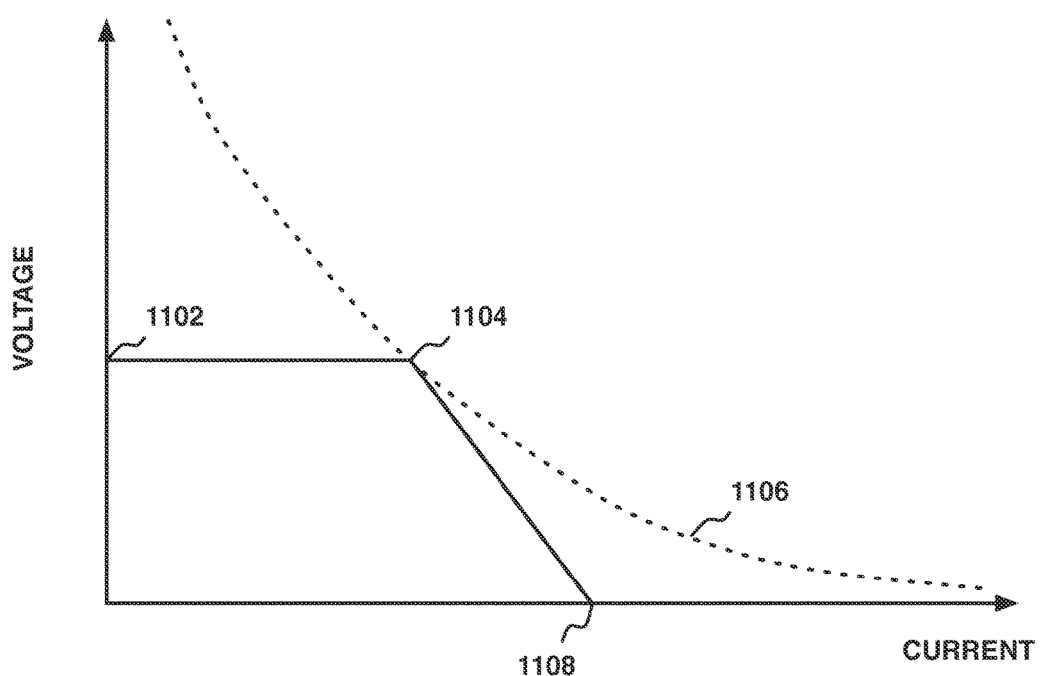
FIG. 11 is a conceptual illustration of a relationship between output voltage and output current in a computer system, according to various embodiments of the present invention.

FIG. 11 is a conceptual diagram of a relationship between output voltage and output current in a computer system, according to various embodiments of the present invention. As shown, the vertical axis represents the regulated output voltage applied to the system, and the horizontal axis represents the load current of the system. Curve 1106 represents a curve of constant power reflecting the maximum capability of the system power power supply.

The voltage level of the line segment between point 1102 and point 1104 represents the output level of the regulator when the system is operating at a power level that is beneficial to the system and within the capability of the power supply. The product of the voltage level at point 1104 and the current level at point 1104 represents a system power that is coincident with the maximum capability of the power supply.

The line segment between point 1104 and point 1108 represents a linear reduction in the system voltage that may be produced by the action of the embodiments depicted above in conjunction with FIGS. 4 through 7.

Figure 12:
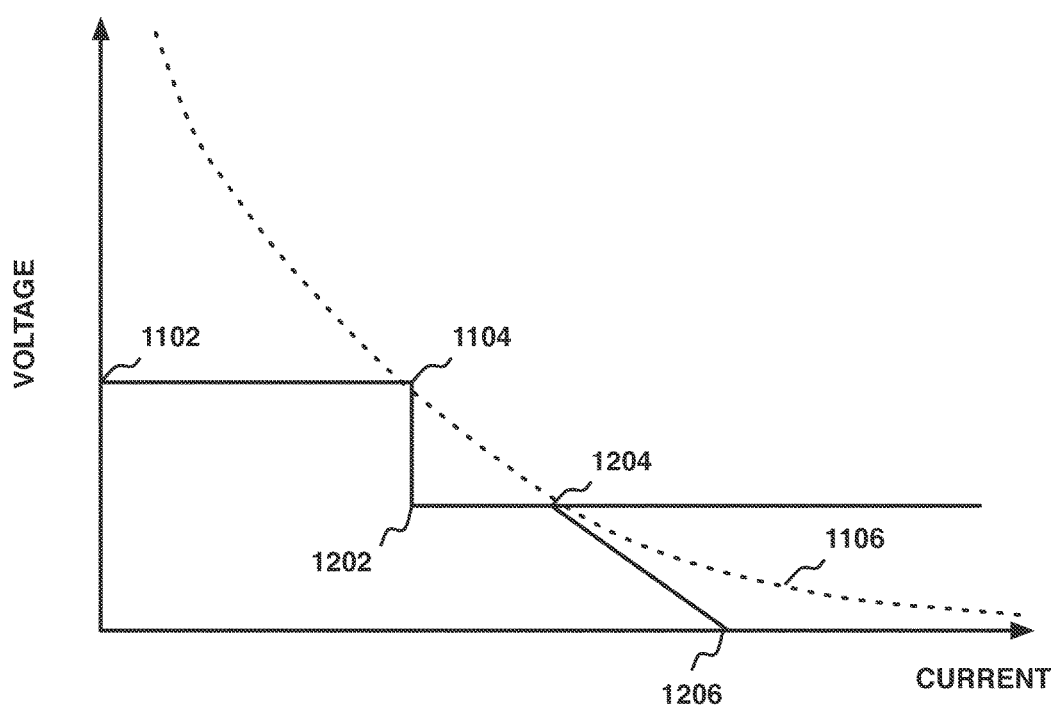
FIG. 12 is a conceptual illustration of a second relationship between output voltage and output current in a computer system, according to various embodiments of the present invention.

FIG. 12 is a conceptual diagram of a second relationship between output voltage and output current in a computer system, according to various embodiments of the present invention. As shown, the constant system voltage from point 1102 and point 1104 and the constant power curve 1106 are the same as is depicted above in conjunction with FIG. 11.

The line segment from point 1104 to point 1202 represents a step reduction in the system voltage that may occur as a result of the action of the embodiments depicted above in conjunction with FIG. 8 through 10. The reduced voltage level at point 1202 maintains the system power to within the capability of the system power supply. The system power consumption increases along the line from point 1202 to point 1204, until, at point 1204, the system power consumption again approaches the maximum capability of the system power supply. Beyond point 1204, the embodiments depicted above in conjunction with FIG. 8 through 10 may reduce the system voltage along a curve of negative slope, reaching zero voltage at point 1206. Alternatively, embodiments may maintain the voltage at the step-down level or may reduce the system voltage along constant power curve 1106.

Figure 13:
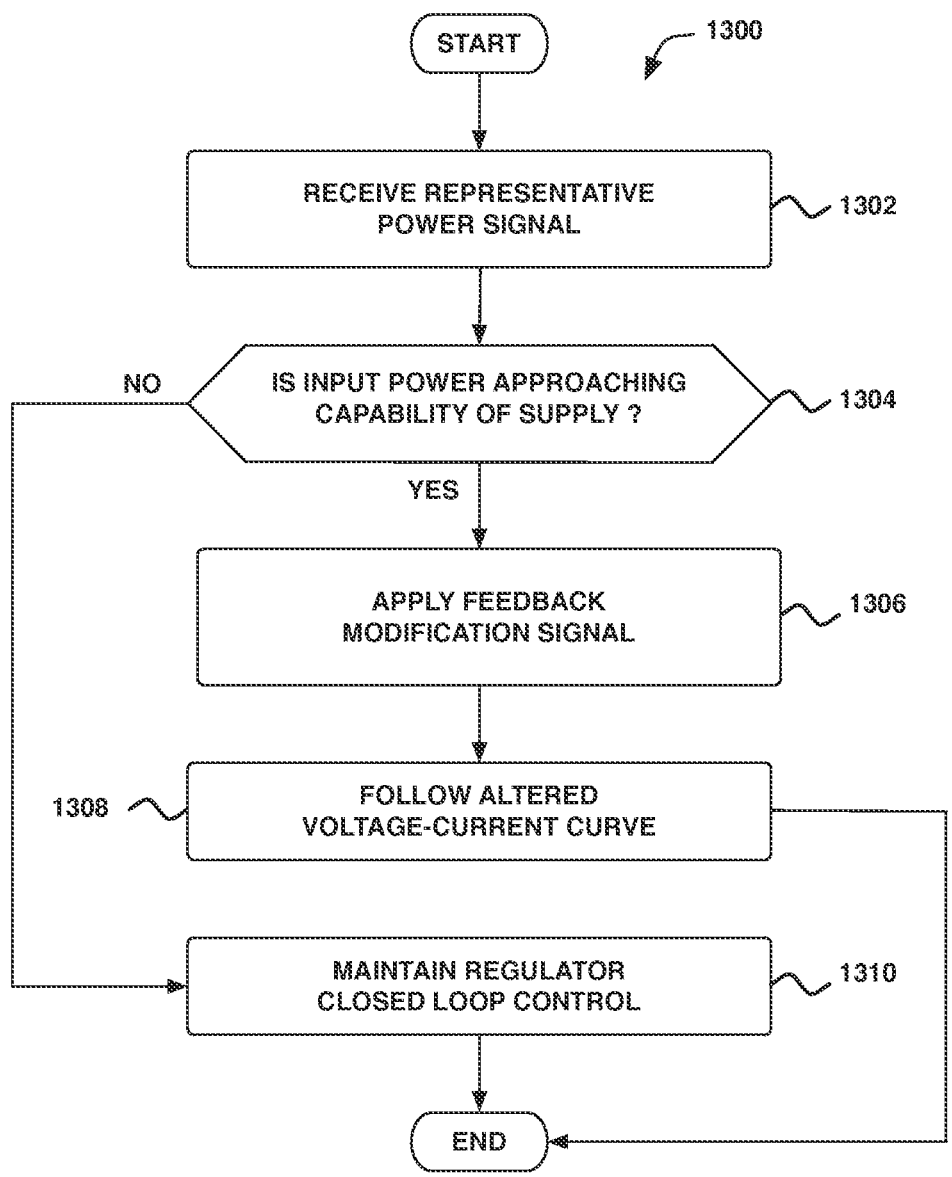
FIG. 13 is a flow diagram of method steps for controlling power to a processor as processing demands change, according to various embodiments of the present invention.

FIG. 13 is a flow diagram of method steps for controlling power to a processor as processing demands change, according to various embodiments of the present invention. Although the method steps are described in conjunction with the systems of FIGS. 1-12, persons skilled in the art will understand that any system configured to perform the method steps, in any order, is within the scope of the present invention.

As shown, a method 1300 begins at step 1302, where power control 310 receives a representative power signal. At step 1304, power control 310 determines if the system power consumption is approaching the maximum capability of the system power supply.

If, at step 1304, power control 310 determines that the system power consumption is not approaching the maximum capability of the system power supply, then the method proceeds to step 1310. At step 1310, power control 310 maintains the regulator closed loop control. The method then ends.

If, at step 1304, power control 310 determines that the system power consumption is approaching the maximum capability of the system power supply, then the method proceeds to step 1306. At step 1306, power control 310 applies a feedback modification signal to voltage regulator 304. As described above in conjunction with FIGS. 3 through 10, the feedback modification signal may be an increase in the output voltage feedback to the regulator, a decrease in the regulator reference voltage, or an increase in the current feedback control. Further the feedback modification may be based on output or input power measurement or on output or input current measurement.

At step 1308, voltage regulator 304 and PPU 306 follow an altered voltage-current curve that power control 310 enforces. The method then ends.

In sum, a power subsystem is configured to manage the power usage of a computer system. A sensing element determines when power usage approaches the maximum capability of the system power supply. The subsystem then generates a signal that represents the power usage of the system and applies the signal to the voltage regulator. The signal thus generated may be derived from measurement of the input power, the output power, the load current, or any other signal that corresponds to power usage. The subsystem then applies the signal to the voltage regulator as a secondary regulation function such that the regulated output voltage is reduced in a manner that supports maximized operating voltage while limiting power usage to within the capability of the power supply. To control the output voltage, the signal may be configured as a modification of the feedback voltage, of the reference voltage, or of the current control signal of the regulator. As a result the subsystem causes the computer system to operate at an optimum point on the voltage-current curve of the system power supply.

At least one advantage of the techniques disclosed herein is that reducing the regulated voltage as a function of load current, and hence load power, allows the regulator to maintain the system operating voltage at the maximum level that is within the capability of the system power supply. Further, the disclosed subsystem may be implemented within the regulator subsystem without burdening the PPU or processor, and without incurring processing or conversion delays, thus achieving fast, accurate, and efficient utilization of the voltage-current curve of the system power supply.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processor or gate array.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A subsystem configured to regulate power to a processor, the subsystem comprising:
   a voltage regulator configured to output a first voltage, wherein the first voltage has a maximum power capability;
   a power detector configured to generate a first signal that represents an amount of power being used by the processor; and
   a controller configured to:
      determine that the amount of power being used by the processor is approaching the maximum power capability,
      combine the first signal with a control signal to generate a second signal, wherein the control signal represents a modification to the first voltage, and
      transmit the second signal to the voltage regulator, causing the voltage regulator to reduce the first voltage thus limiting the amount of power being used by the processor.

2. The subsystem of claim 1, wherein the power detector is further configured to:
   receive a third signal that represents a current input to the regulator;
   receive a fourth signal that represents an amount of current being used by the processor;
   compare a magnitude of the third signal and a magnitude of the fourth signal; and
   generate the first signal that represents the amount of power being used by the processor based on a difference between the magnitude of the third signal and the magnitude of the fourth signal.

3. The subsystem of claim 2, wherein the controller is further configured to:
   receive the first signal;
   receive the control signal that represents the first voltage;
   generate the second signal based on a sum of the first signal and the control signal; and
   transmit the second signal to a voltage feedback input of the voltage regulator.

4. The subsystem of claim 2, wherein the controller is further configured to:
   receive the first signal;
   receive the control signal that represents a reference voltage;
   generate the second signal based on a difference between the first signal and the control signal; and
   transmit the second signal to a reference input of the voltage regulator.

5. The subsystem of claim 1, wherein the power detector is further configured to:
   receive a fifth signal that represents a current output of the regulator;
   compare the fifth signal to a threshold level; and
   generate the first signal that represents the amount of power being used by the processor based on the current output of the regulator.

6. The subsystem of claim 5, wherein the controller is further configured to:
   receive the first signal;
   receive the control signal that represents the first voltage;
   generate the second signal based on a sum of the first signal and the control signal; and
   transmit the second signal to a voltage feedback input of the voltage regulator.

7. The subsystem of claim 5, wherein the controller is further configured to:
   receive the first signal;
   receive the control signal that represents a reference voltage;
   generate the second signal based on a difference between the first signal and the control signal; and
   transmit the second signal to a reference input of the voltage regulator.

8. The subsystem of claim 1, wherein the power detector is further configured to:
   receive a fifth signal that represents a current output of the regulator;
   receive a sixth signal that represents a current computed by the processor;
   compute a seventh signal based on the fifth signal and the sixth signal;
   compare the seventh signal to a threshold level; and
   generate the first signal that represents the amount of power being used by the processor.

9. The subsystem of claim 8, wherein the controller is further configured to:
   receive the first signal;
   receive the control signal that represents the first voltage;
   generate the second signal based on a sum of the first signal and the control signal; and
   transmit the second signal to a voltage feedback input of the voltage regulator.

10. The subsystem of claim 8, wherein the controller is further configured to:
    receive the first signal;
    receive the control signal that represents a reference voltage;
    generate the second signal based on a difference between the first signal and the control signal; and
    transmit the second signal to a reference input of the voltage regulator.

11. The subsystem of claim 8, wherein the controller is further configured to transmit the first signal to a current input of the regulator.

12. A computer-implemented method for regulating power to a processor, the method comprising:
    receiving a first voltage that is output to the processor, wherein the first voltage has a maximum power capability;
    determining that an amount of power being used by the processor is approaching the maximum power capability;
    generating a first signal that represents the amount of power being used by the processor;
    combining the first signal with a control signal to generate a second signal, wherein the control signal represents a modification to the first voltage; and
    transmitting the second signal to a regulator that causes the regulator to reduce the first voltage to limit the amount of power being used by the processor.

13. The computer-implemented method of claim 12, wherein determining that the amount of power being used by the processor is approaching the maximum power capability comprises:
- receiving a third signal that represents a current input to the regulator;
- receiving a fourth signal that represents an amount of current being used by the processor;
- comparing a magnitude of the third signal and a magnitude of the fourth signal; and
- computing the amount of power being used by the processor based on a difference between the magnitude of the third signal and the magnitude of the fourth signal.

14. The computer-implemented method of claim 12, wherein determining that the amount of power being used by the processor is approaching the maximum power capability comprises:
- receiving a fifth signal that represents a current output of the regulator; and
- comparing the fifth signal to a threshold level.

15. The computer-implemented method of claim 14 wherein transmitting the second signal to the regulator comprises transmitting the second signal to a current input of the regulator.

16. The computer-implemented method of claim 12 wherein generating the second signal comprises computing a sum of the first signal and the first voltage.

17. The computer-implemented method of claim 12 wherein generating the second signal comprises computing a difference between the first signal and a reference voltage.

18. The computer-implemented method of claim 12 wherein the second signal causes the regulator to decrease the first voltage linearly without exceeding the maximum power capability.

19. The computer-implemented method of claim 12 wherein the regulator is configured to reduce the voltage by:
- decreasing the first voltage by an incremental amount;
- determining that amount of power being used by the processor is still approaching the maximum power capability; and
- decreasing the first voltage linearly without exceeding the maximum power capability.

20. A computing device, comprising:
- a processor;
- a voltage regulator configured to output a first voltage, wherein the first voltage has a maximum power capability;
- a power detector configured to generate a first signal that represents the amount of power being used by the processor; and
- a controller configured to:
  - combine the first signal with a control signal to generate a second signal, wherein the control signal represents a modification to the first voltage, and
  - transmit the second signal to the voltage regulator that causes the voltage regulator to reduce the first voltage to limit the amount of power being used by the processor.

* * * * *